United States Patent [19]

Stevenson

[11] Patent Number: 5,247,906
[45] Date of Patent: Sep. 28, 1993

[54] SOFT PET LEASH

[76] Inventor: Marc L. Stevenson, 3531 Central Ave., Nashville, Tenn. 37205

[21] Appl. No.: 932,793

[22] Filed: Aug. 20, 1992

[51] Int. Cl.⁵ ............................................. A01K 27/00
[52] U.S. Cl. .................................... 119/795; 119/792
[58] Field of Search ............................... 119/106, 109

[56] References Cited

U.S. PATENT DOCUMENTS

| | | | |
|---|---|---|---|
| 2,737,154 | 3/1956 | Michonski | 119/109 |
| 2,994,300 | 8/1961 | Grahling | 119/109 |
| 3,096,741 | 7/1963 | Ollstein | 119/109 |
| 4,735,035 | 4/1988 | Mattioli | 119/109 |
| 4,777,784 | 10/1988 | Ferguson | 119/109 |
| 4,962,929 | 10/1990 | Melton | 119/109 |

FOREIGN PATENT DOCUMENTS 512534  9/1939  United Kingdom ................ 119/109

Primary Examiner—John G. Weiss
Attorney, Agent, or Firm—I. C. Waddey, Jr.

[57] ABSTRACT

In the present device, a piece of nylon webbing is used which has a soft interior and exterior and is round but also is very strong. The leash has a looped handle at one end, an elongated body in the middle, and a loop at the other end which can receive a standard metal hook. The handle, elongated body, and loop is made of a chord constructed of a nylon webbing sleeve which is round and which encircles a core of cotton material having a density in the range of 2 to 5.2 grams per linear inch of one inch diameter material.

10 Claims, 2 Drawing Sheets

SOFT PET LEASH

BACKGROUND OF THE INVENTION

The present invention relates generally to an animal restraint device and more particularly to a pet leash which is very strong yet soft for the handler's hands and legs.

It will be appreciated by those skilled in the art that leashes are often used to control animals. It will be further appreciated by those skilled in the art that these leashes must be strong to prevent an animal from breaking the leash. It will be further appreciated by those skilled in the art that in most cases, the animal handler holds the leash in his or her hand thereby making it important that the leash does not dig into the user's hand when the animal pulls hard against the leash. An animal, at times, may wrap the leash around the users leg thereby making it important that the leash does not dig into the user's leg.

Presently, leash handles fall within two categories. One category is a mere piece of coarse rope or chord which is looped around itself to form a loop. Unfortunately, the chord or rope can tend to dig into the user's hand. Another type of leash uses a leather loop which is flat which also tends to dig into the user's hand. Manufacturers have not used soft material in the construction of leashes because the soft material generally does not provide the necessary strength. Leashes of the prior art, when made of a strong material are unsatisfactory because the high tensile strength materials usually dig into the handler's hand or leg when the animal wraps the leash around the handler's leg.

What is needed, then, is a pet leash which is very strong. This pet leash must also be very soft so that it does not injure the handler. This leash must be soft not only at the handle but also along the elongated body in case an animal wraps the leash around the user's leg. Also, the elongated body of the leash needs to be soft so that it may be gripped by the handler to gain more control over the animal. This pet leash is presently lacking in the prior art.

SUMMARY OF THE INVENTION

In the present device, this leash is constructed of a soft, low density cotton (or similar material) core of circular cross-section within a woven web nylon (or material of similar strength) hollow sleeve. The leash has a looped handle at one end, an elongated body in the middle, and a loop at the other end which can receive a standard metal hook. Accordingly, one object of the present invention is to provide a pet leash which is round so that it does not cut into the user's hand.

Still another object of the present invention is to provide a pet leash which is made of a very soft material so that it does not excessively irritate the handler's hand.

Still another object of the present invention is to provide a pet leash which is very strong so that it can withstand forces applied to it by a large dog or other strong animal.

DESCRIPTION OF THE PREFERRED EMBODIMENT

Figure 1:
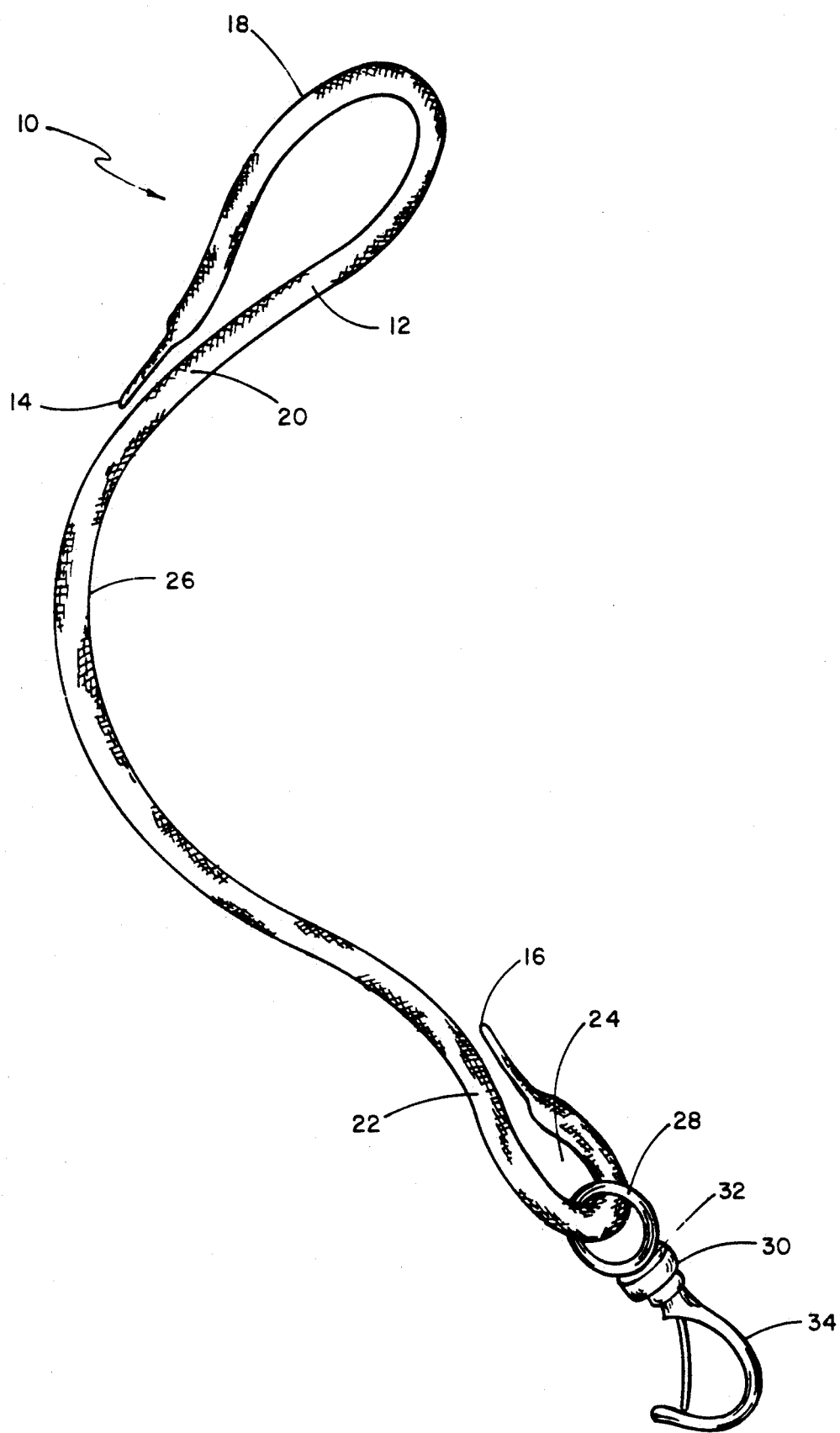
FIG. 1 is a prospective view of the soft pet leash of the present invention.

Referring now to FIG. 1 there is shown generally at 10 the soft pet leash of the present invention. Pet leash 10 is made of chord 12 which runs from first end 14 to second end 16. Handle 18 is made by looping first end 14 to contact first attachment point 20 and stitching first end 14 to first attachment point 20 thereby creating handle 18. Second end 16 is looped back around to second attachment point 22 to form loop 24. First end 14 is stitched, in the preferred embodiment, to first attachment point 20 to create handle 18. Second end 16, in the preferred embodiment, is stitched to second attachment point 22. In between first attachment point 20 and second attachment point 22 there is elongated body 26. Prior to stitching of second end 16 to second attachment point 22, ring 28 of clasp 30 is placed into loop 24 thereby securing clasp 30 to chord 12 to create leash 10. Clasp 30 has pivot 32 in the preferred embodiment as well as hook 34 to attach to the collar of the animal.

As can be seen in FIG. 1, chord 12 is continuous from first end 14 to second end 16. At both first end 14 and second end 16, core 36 (FIGS. 2a and 2b) is removed to allow a flat region to aid in stitching.

Figure 2A:
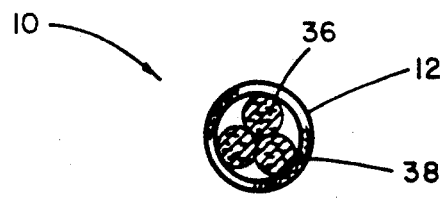
FIGS. 2a and 2b are cross-section views of the structure of the present invention.
Figure 2B:
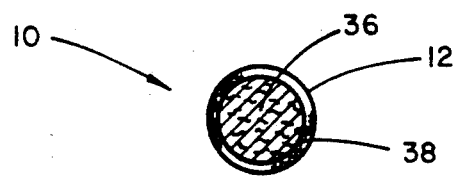

Referring now to FIGS. 2a and 2b there is shown a cross-section of chord 12 having core 36 and sleeve 38. In the preferred embodiment, sleeve 38 of chord 12 is either Climb-Spec TM nylon webbing or Spectrum TM webbing from Blue Water Manufacturing Company. Similar materials are available from other manufacturers and may be used to construct sleeve 38. In the preferred embodiment, chord 12 is one inch tubular. Climb-Spec TM nylon webbing is a fine weave pattern which creates a webbing that is stronger and more resilient to abrasion and cutting than standard webbing. Spectrum TM webbing is also a fine weave pattern which creates webbing that is stronger and more resilient to abrasion than standard webbing. Core 36 is a cotton or similar material, circular in cross-section, having a density in the range of 2 to 5.2 grams per linear inch of the core in a 1" diameter material. I have found that the density of the core is critical to the construction of a leash that meets the objectives of my invention. A leash having a core 36 with a density below the stated range will tend to flatten and then cut the hand of the handler in response to a hard pull by the restrained animal. Conversely, a leash having a core 36 with a density above the stated range tends to be hard and abrasive, likewise tending to cut the hand of the handler in response to a hard pull.

Figure 3:
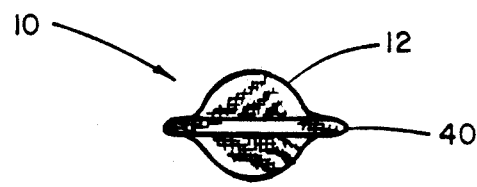
FIG. 3 is an end view of the nylon webbing after the interior has been removed.

Referring now to FIG. 3 there is shown generally at 12 an end view of the chord of the present invention. As can be seen, end 40 of chord 12 is flattened having core 36 removed to provide ease of stitching. End portion 40 can be at either first end 14 or second end 16 in FIG. 1.

Figure 4:
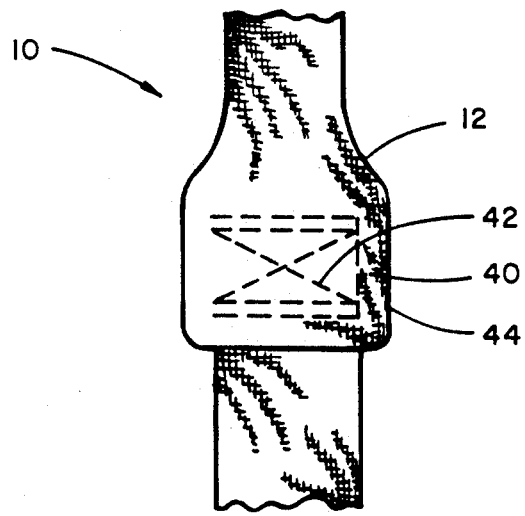
FIG. 4 is a plan view showing the stitching at the end of the handles as well as the loop.

Referring now to FIG. 4 there is shown generally at 12 another view of the chord of the present invention. In this instance, end portion 40, after being flattened in a manner described above, is stitched using stitching 42 to attachment point 44 which is optically disposed in this figure. Attachment point 44 can be either first attachment point 20 or second attachment point 22.

Chord 12 uses a sleeve 38 which is strong and soft which covers core 36. Core 36 is round and relatively soft, but of a density sufficient to hold its shape against the pressure of a hard pull. The sleeve 38 provides the strength whereas the core 36 provides the softness.

Thus, although there have been described particular embodiments of the present invention of a new and useful soft pet leash, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A leash for handling an animal comprising:
   a. a chord having a first end, a second end, a first attachment point and a second attachment point;
   b. a handle created by said first end being attached to said first attachment point;
   c. a loop created by attaching said second end to said second attachment point;
   d. an elongated body between said first attachment point and said second attachment point;
   e. a hook received by said loop;
   f. said chord being constructed of an outer sleeve and an inner core, and
   g. said inner core being constructed of a material having a density in the range of 2 to 5.2 grams per linear inch of 1" diameter material.

2. The device of claim 1 wherein the sleeve of said chord is nylon webbing.

3. The device of claim 2 wherein said chord is tubular.

4. The device of claim 1 wherein said chord is one inch diameter tubular nylon webbing with a core of soft cotton material.

5. The device of claim 1 wherein said first end and said second end are substantially flat.

6. A leash for handling an animal, said leash having a handle, an elongated body, and a hook, said leash comprising:
   a. a chord forming said handle at one end and a loop at a second end, said loop receives said hook; and
   b. said chord being constructed of a nylon webbing sleeve and a cotton core having a density in the range of 2 to 5.2 grams per inch of one inch diameter core material.

7. The device of claim 6 wherein:
   a. said chord having a first end, a second end, a first attachment point and a second attachment point;
   b. said handle created by said first end being attached to said first attachment point; and
   c. said loop created by attaching said second end to said second attachment point.

8. The device of claim 6 wherein said chord is tubular.

9. The device of claim 6 wherein said chord is one inch tubular nylon webbing.

10. The device of claim 7 wherein said first end and said second end are substantially flat.

* * * * *